Patented June 22, 1926.

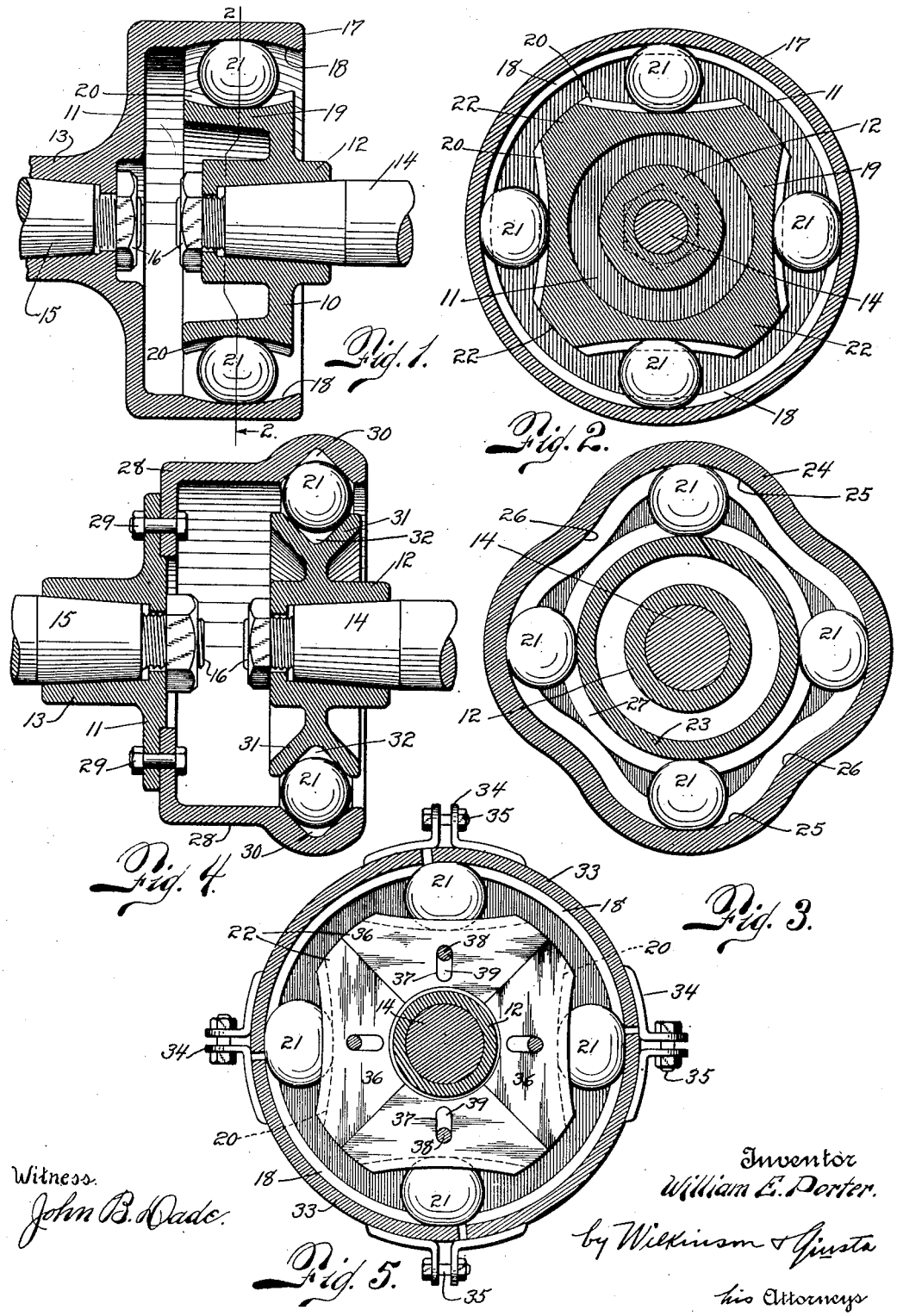

1,590,055

UNITED STATES PATENT OFFICE.

WILLIAM E. PORTER, OF DENVER, COLORADO.

MACHINE ELEMENT.

Application filed December 7, 1922. Serial No. 605,453.

This invention relates to the art of machine elements and more particularly embodies improvements in resiliently and positively cushioned connecting devices for complementary co-acting revoluble bodies, whether said bodies are to be continuously revolved or only partially rotated back and forth in an oscillatory manner.

It has heretofore been proposed to employ coupling units for rotary shafting which embody inner gripping or wedging members, such as pivotal shoes or their equivalent, mounted in cooperative association with a substantially larger encompassing outer rim, or housing member, and with resilient cushioning means interposed therebetween, the said cushioning means being in the nature of a more or less compressed ring that is circular in cross-section and which may be formed as a substantially solid or as an inflated annulus of rubber or analogous material. In connection with the foregoing, the whole combined arrangement is such as to in a large measure resiliently compensate for axial and radial play or thrusts, torsional strains or stresses and angularity of play, displacement or disposition, relatively to true axial alignment, while at the same time providing against undue vibration, burring or grating noises and the necessity of lubrication.

With my present improvements, I likewise aim to attain all of these primary objects and results, with reference to coupled shafting, as well as others of an improved and beneficial character not only with relation to shafting but also with other forms of continuously and oscillatory rotatable bodies, although in doing so I have devised means to accomplish the same in a more economical and simple manner, and with a maximum degree of effectiveness, by the employment of a minimum number of parts and by the use of a plurality of resilient rounded elements directly located between the opposed and substantially spaced peripheral faces of the outer and inner coupling units, which rounded elements are so mounted, in annularly spaced relation, as to provide for a gradual wedging action with restricted or limited rolling movement annularly in the direction of the planes of rotation of said coupling units. In other words the rounded elements are mounted not only for rotation around their own axes, during said wedging action, but also for limited rolling, at the same time, in revoluble relation to the shafting axis.

In some instances this restricted annularly rolling movement of said resilient elements is limited by the particular formation of the outer peripheral face of the inner coupling unit and in other instances by the formation of the inner peripheral face of the outer coupling unit, while in still other instances it may be owing to the formation of both of said peripheral faces, but in all of such instances, and upon a partial rotation of either of said coupling units, the resilient elements will roll in the aforesaid direction of rotation until they gradually become wedged between the opposed peripheral faces of the two coupling units, when both coupling units will rotate in unison. If said rounded elements be of approximately spherical or analogous form, the rolling thereof may be in all directions or transversely of as well as in the said plane of rotation of said coupling units, suitable provision being made for said transverse rolling, and in such latter event the device would function as a positively cushioned universal joint.

However, the foregoing and other objects and advantages of my improvements will be so clearly apparent, as incidental to the following disclosure, that it would serve no useful purpose to further enlarge upon the same initially, and with these prefacing remarks, therefore, reference will now be immediately had to the accompanying drawings, illustrating certain practical embodiments of my invention, in which drawings Figure 1 is a central longitudinal sectional view through one form of my improved device, the rounded cushioning elements being shown as initially compressed elastic balls that are restrained against undue circumferential displacement by the particular formation of the peripheral face of the inner coupling unit; Figure 2 is a transverse cross-sectional view taken along the plane of the line 2—2 of Figure 1; Figure 3 is a sectional view taken in an analogous plane to Figure 2 and illustrating a modified construction, wherein the inner coupling unit is cylindrical, although it may be of the form shown at Figure 2, and the outer coupling unit provides for the restraining means to limit the rolling movements of the cushioning balls against undue circumferential displacement; Figure 4 is a sectional view taken in an analogous plane to Figure 1 and illustrating another modified construction, wherein the inner and outer coupling units, whether of the general formation of either Figure 2 or Figure 3, are provided with oppositely disposed complementary V-shaped grooves or channels for the spaced reception of the cushioning balls; and Figure 5 is a sectional view of another modified construction taken in a plane analogous to Figure 2 and illustrating, in more or less of a conventional manner, adjustable means broadly for contracting the outer coupling member or expanding the inner coupling unit, which may be desirable in some instances of use.

The same broad principles, as previously outlined, may be embodied in various other modified constructions, but it is not thought necessary to specifically illustrate the same, as they are generally embodied in the construction illustrated at Figs. 1 and 2.

Also, while the drawings disclose each of the coupling units as attached to a continuously rotatable shaft, either of which may be the driving or the driven shaft, still it may be again emphasized at the outset that my particular improvements are not necessarily limited to the coupling of shafting but may be employed in various other relations, wherein only partial back and forth rotation or oscillatory motion is imparted, such as with bumper attachments, snubber or shock absorber attachments, mountings or seatings for connecting the ends of complementary bow springs, rebound checks for bow springs, and for analogous devices and uses, the invention being accordingly claimed for the machine element or cushioned connecting device itself, rather than for and regardless of the various uses to which it may be put.

Furthermore, it may aptly be stated at the outset that in employing the expressions "roll", "rolled", "rolling" or their equivalent, whether with reference to an annular or a transverse direction, I do so with the meaning of the rounded elements or elastic balls actually advancing or traveling with a limited rolling movement on their peripheral surfaces, additionally to and as distinguished from their mere rotation around their own axes within the limits of their own relative zones.

Referring now to Figs. 1 and 2, the numeral 10 designates the outer head wall of the inner coupling member and the numeral 11 that of the outer encompassing coupling member, which said members may be substantially spaced apart bodily both axially and radially. These members are shown as being provided with hubs 12 and 13, respectively, with the adjacent ends of shafts 14 and 15 fitted therein and secured by nuts 16, although, when the device is employed otherwise than with actual shafting, the hub construction is not necessarily essential, and the body portions 10 and 11 could be plane or disk-like surfaces with leverage elements connected thereto.

The outer coupling member provides an annular flange 17 or its equivalent, of suitable width and preferably formed integral with the head wall 11, and the inner peripheral surface thereof is shown as having an annular groove 18 of transverse curvature, or concavely arcuate, and preferably struck on a radius having the axial line of the coupling member as its center. This construction provides for the annular outer rim or housing before referred to.

The inner coupling member is formed or provided with a substantially square-shaped flange 19, or its equivalent, projecting in an opposite direction to the annular flange 17 of the encompassing coupling member, and the outer peripheral surface thereof provides a plurality of elongated seating or restraining grooves or recesses 20 which are of both longitudinal and transverse concavely curving formation. Four of these seating recesses are shown, as the drawings illustrate a substantially squared inner coupling member, but it is obvious for instance that the inner coupling member might be of triangular formation or of a formation embodying a greater number of sides than four, in which events each side would have its aforesaid curving elongated seating recess 20. In fact, with possibly a lesser degree of effectiveness, an oppositely disposed pair only of these seating recesses might be employed.

These recesses 20 are of opposite complementary curvature to the annular transversely curving groove 18 of the outer coupling member, and cooperate therewith to receive and retain the elastic cushioning spheres or balls 21 in an initial slightly compressed state, which balls are adapted for further compression upon the rotation of either coupling member for causing a gripping or wedging action therebetween.

It is to be observed that these recesses 20 are spaced apart by the cut-away or plane-surfaced corners 22 of the portion 19 of the inner coupling member, which portion would otherwise be substantially square, excepting for the recesses 20, and that the distance from said plane-surfaced corners 22, with reference to the curve 18 of the outer coupling member, is less than the distance between the bottoms of the recesses 20 and the curving surface 18, thus providing means for limiting the roll of the balls 21 in both directions circumferentially with reference to the coupling members, and insuring a wedging action between said balls and the inner and outer surfaces 18 and 20, respectively, of said coupling members, in reverse directions when either one or the other of the latter is completely rotated, as in shaft couplings, or rotatably oscillated when employed in other relations where only partial back and forth rotation is required.

It will therefore be obvious that, when either coupling member is rotated, opposite forces are imposed upon the balls 21, causing them to roll circumferentially, in the direction of said rotation, from their centered zones, as shown at Fig. 2, towards the restricted spaces between the corners 22 and the interiorly curved surface 18 of the outer flange 17, whereupon a cushioning frictional gripping is gradually increased, until it finally becomes a positive wedging action, as the balls ride up the curving inclines 20. It will also be obvious that when the elastic rounded elements are thus compressively wedged up, in one direction, they store up energy to cause a snappy or quick rebound in the reverse direction, insuring instant responsiveness upon binding release, which is an important factor generally and of particularly especial value in connection with the satisfactory operation of snubbers or shock absorbers or the like for automotive vehicles.

At the same time, it is to be understood that the balls are otherwise free to roll in all directions, with a limited actual shifting or advancing movement in addition to and as distinguished from mere rotation around their own axes, and thus compensate for axial, radial and angular displacement of the coupling members relatively to each other.

Furthermore, and considering the elasticity of the balls 21, this axial play or elongation of the coupling, the radial play or cushioning feature and the angular displacement or angularity of play, with reference to the coupling members being out of true axial alignment, are all accomplished with resilient cushioning against undue torsional and end thrust strains or stresses upon the coupling members, whereby these and other shocks are absorbed by the elastic functioning of this universal type of coupling.

Also, where there is any angularity of play or angular disposition of the coupling members, relatively to each other, whether horizontally, vertically, or intermediately of a horizontal or vertical direction, the balls 21 are pivotally turned or otherwise rolled between the surfaces 18 and 20 to compensate for such motions or dispositions, and where the movements of the coupling members are endwise, whether angularly disposed or in true axial alignment, the balls will be correspondingly rolled transversely of the surfaces 18 and 20.

Substantially the same functioning as all of the foregoing would result, although with a slower gripping action, if the outer faces of the inner member were actually squared, which latter I consider an equivalent construction.

In the modified device, as shown at Figure 3, the functioning thereof is substantially the same as before described, and does not therefore require such an elaborate explanation. In this construction, however, the inner coupling member 23 is shown as of cylindrical form, although it may be of other suitable formation such as the substantially squared construction shown at Figure 2, while the flange 24 of the outer coupling member may or may not be cylindrical externally, but the inner surface thereof is of a peculiar irregular encompassing curvature to provide the elongated retaining recesses or pockets 25, for seating the balls 21 against undue circumferential displacement or in the direction of rotation of the coupling members. As will be obvious, the gradual binding or wedging action of the interposed balls 21 between the cylindrical inner member 23 and the pockets 25 is practically the same as heretofore described, the pockets having inwardly curving shoulders or humps 26 therebetween which form restricted spaces with the cylindrical inner member 23, analogously to the restricted spaces between the corners 22 and the surface 18 as described with reference to Fig. 2. The pockets 25 may be transversely curved to permit of the transverse rolling of the balls 21, so that this construction likewise provides means to fully compensate for radial, axial and angular displacement of the coupling members with an elastic cushioning control. The outer face of the cylindrical member 23 might be plane-surfaced transversely, but it doubtless would be preferable to make it transversely curved, as at 27, similarly to the transverse curvature of the recesses 20 as shown at Fig. 1. Also, as analogously referred to in connection with Figs. 1 and 2, the plurality of seating recesses or pockets 25 may be less or more in number than the four shown.

The modification shown at Fig. 4 is primarily intended to illustrate a construction that is more or less limited to cushioning features in all directions rather than to permit of a great amount of axial or angular play, although to a certain extent it will also allow for these latter features, and to further illustrate the housing rim as non-integral with the head body portion 11, instead of integrally formed therewith as shown in the preceding figures. In this construction, the encompassing flange or rim housing is indicated at 28 as being a separable element providing an inturned vertical annular flange that is bolted to the head 11, as by the bolts 29, and instead of the inner peripheral surface of the housing rim being transversely curved, this surface has a V-shaped groove extending therearound as indicated at 30. The inner coupling member of this modified form has a peripheral V-shaped groove 32, formed by the divergent walls 31, adapted for normal registration with the V-shaped groove 30 of the encompassing rim, and between which are seated the elastic spheres 21 that are retained in spaced wedging relation as heretofore described. In so far as this modified construction is concerned, the outer housing rim may be cylindrical with the inner coupling member of substantially squared form, as at Fig. 2, or the outer and inner coupling members may be substantially of the forms described for Figure 3, and in either instance a greater or less number than four of the plurality of restraining recesses or pockets may be employed.

At Figure 5, there is simply illustrated broadly adjustable means for regulating the contraction and expansion of the encompassing coupling member and the inner coupling member, for regulating the normal compression of the elastic balls, which may be found desirable in some instances and especially where the coupling unit is employed for heavy load strains when the torque of the shafting or torsional stresses thereon are much greater than in general average uses. This might be accomplished in various ways, but I have only illustrated one such means in a general and somewhat conventional manner. As shown, the outer encompassing coupling member may be of sectional form as indicated at 33, the end edges of which sections are slightly spaced, and the abutting ends of these sections provide a pair of aligned spacing ears 34 with regulating bolts 35 for the endwise adjustment of said sections. In this arrangement, the sectional housing rim 33 would be a separable set of such sections secured to a head wall by means of bolts, somewhat analogously to the arrangement indicated at 11 and 29 of Fig. 4, but either the head wall or the vertical flange of the rim sections or both would provide short circumferentially disposed slots for the bolts 29 to permit of the circumferential adjustment of the rim sections 33. The inner coupling means would also be of sectional form as indicated at 36, and these sections would be provided with radial short slots 37, associated with securing bolts 38 and with complementary bolt holes for the latter formed in a disk or flange wall 39 carried by the hub 12 or its equivalent. However, while I have thus shown and described this adjustable feature for the regulation of the initial compression of the elastic balls 21, I have only done so in a general way, and doubtless other satisfactory means might be employed for accomplishing the same ends.

It should be emphasized that, in all of the structures shown, the peripherally disposed seating recesses or pockets, as referred to, of either of the coupling units, as well as the peripheral surfaces of the other coupling unit opposing the same, are all struck on arcs having a substantially greater radius than the radius, or even the diameter, of the resilient rounded elements or balls, to provide elongated wedging surfaces for the limited annularly rolling movements aforesaid, and this regardless of their being transversely arcuate as is preferred in all of the structures excepting that of Figure 4, as contradistinguished from oppositely located substantially concentric or semi-spheroidal recesses of approximately the same diameter as the balls for the purpose of merely pocketing the balls or journaling rollers, for rotation around their own axes only, as has heretofore been proposed.

In summing up, it would seem to be apparent that the devices are of a self-centering character; that the elastic balls are always more or less compressed; that the inner and the housing members of the coupling are of such shape and are so disposed as to create a gradually increasing binding or wedging action therebetween, by virtue of the intervening resilient spherical cushions or elastic balls, when rotary force is applied to either of said coupling members; that the wedging action of the inner and outer members against the elastic balls, and the adaptability of the latter to roll in all directions, provide not only a positive cushioned coupling, that absorbs radial shocks and axial stresses or end thrusts, but also provide such a coupling of a universal type that permits of elongation and angularity of play between the coupling members; and finally that adjustment may be provided for regulating the initial compression of the elastic balls.

From the foregoing complete description of the invention, it is believed that the utility and full advantage thereof will now be obvious, but, while I have thus fully set forth the same, it will nevertheless be understood that I do not confine myself necessarily to all of the details exactly as disclosed, excepting as they may come within the terms of the ensuing claims and equivalent elements in combination, or as fairly interpreted in the light of the specification if requisite.

For instance, as the elastic balls in being initially compressed assume more or less of an oval shape approaching the form of a cylinder, I would consider it an equivalent to actually form the rolling cushioning elements as of short oval or cylindrical contour, with their major axes disposed transversely between the coupling members, where no great amount of axial or angular displacement is to be compensated for; and in the use of short cylindrical elastic rollers there would be no need of transversely curving, or making concavely arcuate in cross-section, the outer and inner peripheral surfaces, respectively, of the inner coupling unit and its outer encompassing rim. Also, it is to be understood that, without in any way departing from the spirit of the invention, the outer encompassing rim might be of unlimited width, and likewise the opposed peripheral face of the inner coupling member, to permit of a plural arrangement of the combined elements as heretofore described. This serial combination would be of especial utility where heavy radial loads and axial thrusts are to be imposed on the coupling units, but where there would be no great angular displacements.

What I do claim as new and patentable is:—

1. The combination of an inner coupling unit, an outer coupling unit having a housing rim encompassing said inner unit, in substantially spaced relation, and a plurality of resiliently cushioning rounded elements directly mounted peripherally therebetween, the said rounded elements being seated, in annularly spaced relation therearound, by means embodying a continuously annular grooved face disposed around one of said units and registering grooved elongated reversely operating wedging faces formed around the other of said units, for coaction with said continuously annular grooved face to cause the limited roll of said rounded elements, additionally of rotation around their own axes, in all directions of rotation of said units, with a cushioned gradual binding together of all of said parts, upon the rotary movement of one of said coupling units.

2. The combination of an inner coupling unit, an outer coupling unit having a housing rim encompassing said inner unit, in substantially spaced relation, and a plurality of elastic balls directly mounted peripherally therebetween, the said balls being seated, in annularly spaced relation, by means embodying reversely operating elongated curved wedging surfaces and one of which wedging surfaces is continuously annular, for causing the limited roll of said balls, additionally of rotation around their own axes, in all directions of rotation of said units, with a cushioned gradual binding together of all of said parts, upon the rotary movement of one of said coupling units.

3. The combination of an inner coupling unit, an outer coupling unit having a housing rim encompassing said inner unit, in substantially spaced relation, and a plurality of elastic balls directly mounted peripherally therebetween, the said balls being seated, in normally centered and compressed annularly spaced relation, by means embodying concave longitudinally and transversely curved reversely operating elongated wedging surfaces and one of which wedging surfaces is continuously annular, for causing the limited roll of said balls in all directions, both annularly and laterally and additionally of rotation around their own axes, and with a cushioned gradual binding together of all of said parts in all directions of rotation of said units, upon rotary movement of one of said coupling units.

4. The combination of an inner coupling unit, an outer coupling unit having a housing rim encompassing said inner unit in substantially spaced relation, a plurality of elastic balls directly mounted peripherally therebetween, and means for seating said balls in annularly spaced relation, which means embody a continuously annular groove around one of said units and registering grooved elongated reversely operating wedging surfaces formed around the other of said units to permit of the limited roll of said balls in the plane of rotation of said units, with a cushioned gradually increasing binding together of all of said parts, upon the rotary movement of one of said coupling units.

5. The combination of an inner coupling unit, an outer coupling unit having a housing rim encompassing said inner unit in both radial and axial spaced relation, a plurality of elastic balls directly mounted peripherally therebetween, and means for seating said balls in annularly spaced relation, which means embody a continuously annular transversely curving groove around one of said units and registering transversely curving grooved elongated reversely operating wedging surfaces formed around the other of said units, the said seating means permitting of the limited rolling of said balls in all directions, both annularly and laterally, under cushioned gradually increasing compression, to compensate for torsional stresses, radial, axial and angular displacements, and for binding all of said parts together in their plane of rotation upon the application of a rotary force to either one of said coupling units.

In testimony whereof, I affix my signature.

WILLIAM E. PORTER.